United States Patent [19]
Shaw et al.

[11] 3,755,125
[45] Aug. 28, 1973

[54] ELECTROCHEMICAL GAS ANALYZER

[75] Inventors: Manuel Shaw, Los Angeles; Wayne E. Perkins, Arleta, both of Calif.

[73] Assignee: Envirometrics Inc., Marina del Rey, Calif.

[22] Filed: Jan. 14, 1971

[21] Appl. No.: 106,431

[52] U.S. Cl. .......................................... 204/195 P
[51] Int. Cl. ............................................ G01n 27/28
[58] Field of Search .................. 204/195 M, 195 P, 204/195 R, 195 G, 1 T, 195 L, 195 S, 195 F, 195 B; 324/29; 23/254 E, 255 E

[56] References Cited
UNITED STATES PATENTS

| | | | |
|---|---|---|---|
| 3,019,384 | 1/1962 | Wayne | 324/29 |
| 3,591,480 | 7/1971 | Neff et al. | 204/195 M |
| 3,528,904 | 9/1970 | Cliffgard | 204/195 P |
| 3,539,455 | 11/1970 | Clark, Jr. | 204/1 T |
| 3,149,921 | 9/1964 | Warner | 23/232 |
| 2,913,386 | 11/1959 | Clark | 204/195 P |
| 3,260,656 | 7/1966 | Ross | 204/1 T |

OTHER PUBLICATIONS
Beckman Instruments Bulletin 86-K, pp. 11 & 12, April 25, 1956. 956. Copy in 204/195 G.

*Primary Examiner*—G. L. Kaplan
*Attorney*—Lyon & Lyon

[57] ABSTRACT

An apparatus for analyzing the proportion of a selected gas in a mixture of gases wherein gas detector elements are adapted to be removably plugged into an electrical analyzer for converting the electrical currents produced by such detectors into readings of proportions of the selected gases including compensating for the detection of multiple gases by one detector through the use of another detector responsive to less than all of such multiple gases to produce a reading of the proportion of the other gases. The detector comprises a unitary assembly of an electrolytic cell of uniquely simple construction with a membrane separating the cell from the chamber through which the gas mixture is passed and an electrolyte reservoir in full communication with the cell.

21 Claims, 11 Drawing Figures

INVENTORS.
MANUEL SHAW
WAYNE E. PERKINS
BY
Lyon & Lyon
ATTORNEYS

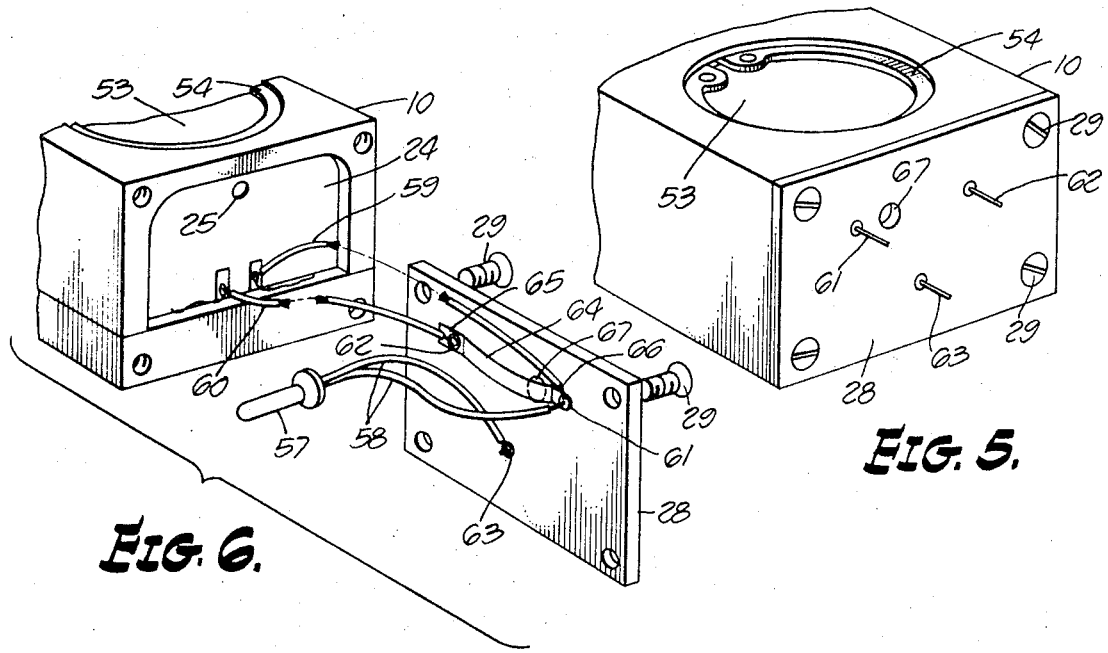
FIG. 6.
FIG. 5.
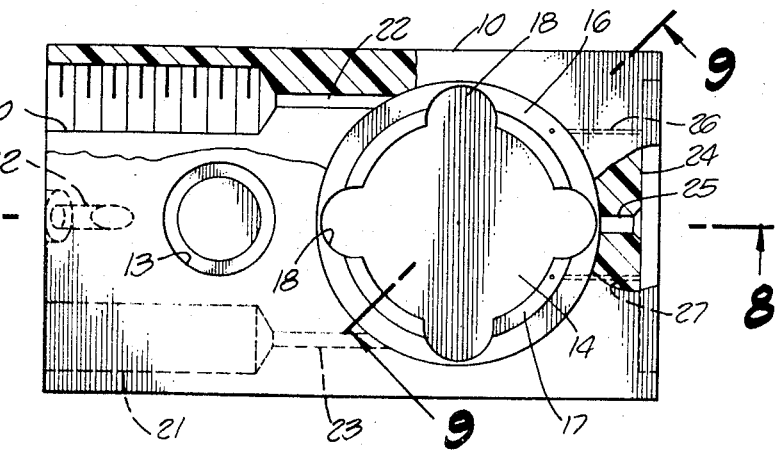
FIG. 7.
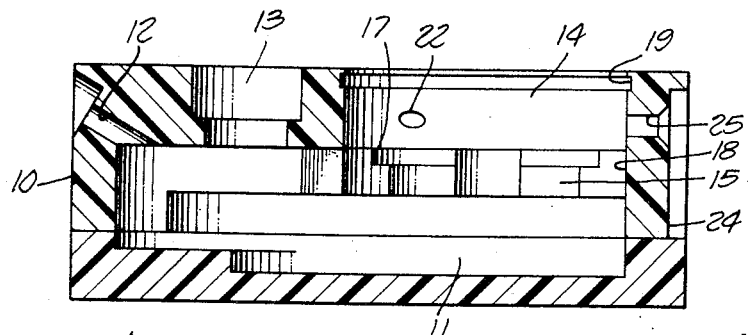
FIG. 8.

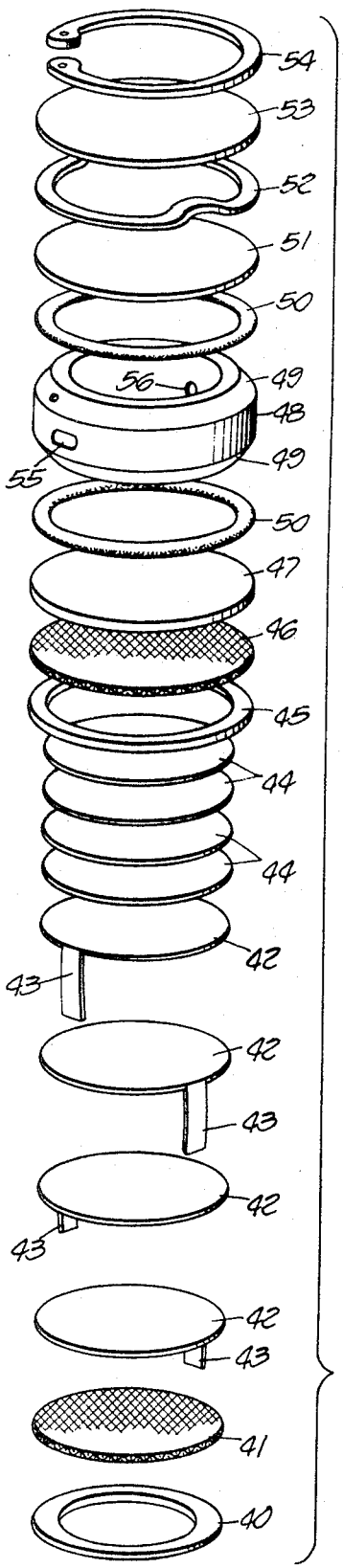
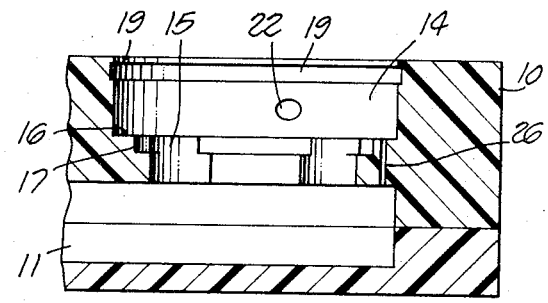
FIG. 9.
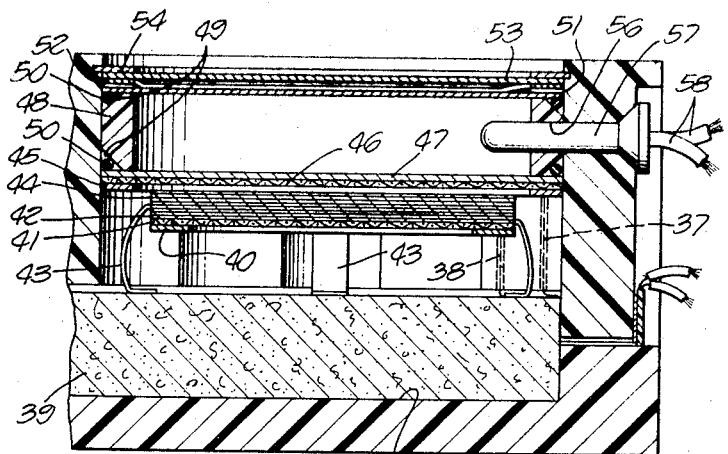
FIG. 10.
FIG. 11.
INVENTORS.
MANUEL SHAW
WAYNE E. PERKINS
BY
Lyon & Lyon
ATTORNEYS

3,755,125

ELECTROCHEMICAL GAS ANALYZER

The detection of certain gaseous components of a mixture of gases whether in ambient air or in the emissions from a particular gas-producing process or mechanism, has always been useful information but in view of increasingly restrictive laws and regulations limiting the allowable emission of pollutants such detection has become extremely important. The detection and analyzing of the proportion of a selected gas among a mixture of gases has long been possible with various laboratory techniques and apparatus which produce very satisfactory results if properly operated. However many such laboratory-suited techniques require equipment or materials that are not well suited to use in the field or use by untrained technicians. For example many known laboratory techniques employ chemical reagents and/or liquid solutions together with complex and delicate plumbing arrangements which are not portable and the accuracy depends to the great extent on the ability of the operator.

The concept of employing an electrolytic cell which is influenced by the proportion of the particular gas exposed to the cell to produce either a change in the resistance of the cell or the electrical current produced by the cell to indicate the proportion of that particular gas is not unknown and has been the subject of a number of patents such as U.S. Pat. Nos. 2,913,386, 3,071,530, 3,239,444, 3,351,544 and 3,394,069. Many of the prior art electrolytic cells have been of such a complex or delicate nature as to be limited to laboratory use although there are some that have limited non-laboratory uses such as the device shown in U.S. Pat. No. 3,071,530 for sensing oxygen in space vehicles. Still other prior art electrolytic cells are of designs and constructions that are only practical for use in detecting various gases depending on the particular electrodes and electrolyte selected for the cell.

Another problem in detecting certain gases by means of electrolytic cells is that the presence of other gases will influence the response of the cell thereby producing an incorrect reading. For example an electrolytic cell, as presently known, that will detect nitrogen oxides will be influenced by the presence of such gases as sulfur dioxide in the gaseous mixture thereby giving a false reading of the actual proportion of only the nitrogen oxides. Again although laboratory type equipment will differentiate between gases such as nitrogen oxides and sulfur dioxide, such equipment is impractical for field use.

The sensitivity of gas analyzing equipment often depends on the type of equipment being used whereby certain equipment may be suitable for analyzing the stack gases from an industrial plant but would lack the sensitivity necessary to analyze ambient air for the same selected gases. Conversely a more sensitive type instrument adapted for ambient air analyses is normally unsuitable for analyzing the heavier concentrations of various gases and pollutants present in the stack gases of industrial plants.

Accordingly in summary it is the objective of this invention to provide a novel construction for an electrolytic cell which is extremely rugged, dependable, compact and versatile and that is adapted to plug into an electrical meter analyzer for producing a reading related to the response of the cell wherein plural cells may be used in the same analyzer to selectively analyze the proportions of various components of a fluidic mixture by employing the electrical responses of one or more of the cells.

An object of this invention is to provide a very simple but highly efficient construction for an electrolytic cell that is completely self-contained and adapted to be readily connected to the source of the fluidic mixture to be analyzed and plugged into the electrical analyzer.

Another object of this invention is to provide a novel form of electrolytic cell for detecting the proportion of a selected component of a fluidic mixture passed therethrough and wherein a temperature responsive element is provided for modifying the electrical analysis of the cell response to compensate for temperature variation effecting the cell response.

A further object of this invention is to provide an electrochemical gas analysis system employing an electrical analyzer meter for selectively analyzing the electrical responses of various replaceable electrolytic cells that are specifically adapted to respond to one or more selected gases present in a mixture of gases within selected concentration whereby the desired range of response is obtained. A still further object is to provide such a system wherein the response of one electrolytic cell is employed to electrically compensate for the response of another electrolytic cell that is responsive to more than one gas.

Further more detailed objects and advantages of this invention will appear from the following description of the preferred embodiment as presently contemplated and illustrated in the drawings, wherein:

FIG. 5 is a perspective end view of the electrolytic cell sensor shown in FIG. 3 but illustrating the opposite end of the sensor.

FIG. 6 is a fragmentary exploded view of the end of the sensor illustrated in FIG. 5 and showing the electrical connections within the sensor.

FIG. 7 is a top view of the sensor housing illustrated in FIGS. 3–6 with the various components removed and certain portions shown in section.

FIG. 8 is a sectional elevation view taken substantially on the line 8-8 shown in FIG. 7 and illustrating the internal cavities of the housing.

FIG. 9 is a fragmentary sectional elevation taken substantially on the line 9—9 shown in FIG. 7 and further showing the configuration of the housing.

FIG. 10 is a fragmentary sectional elevation taken on the line 10—10 in FIG. 3 and similar to FIG. 8 but illustrating the various components of the electrolytic cell assembled in the housing in the manner adapted for use.

FIG. 11 is an exploded perspective view of the various components that are assembled in the sensor housing to constitute the electrolytic cell as illustrated in FIG. 10.

Figure 1:
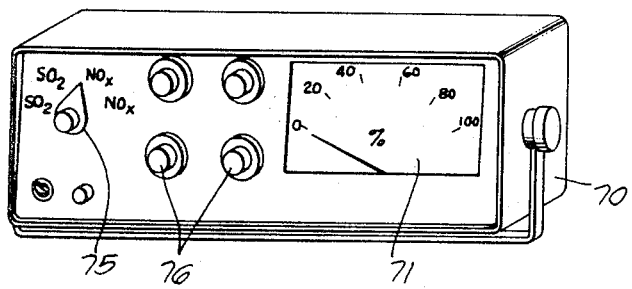
FIG. 1 is a perspective elevation view of the electrical analyzing meter of this invention.

Referring now more particularly to FIGS. 7, 8 and 9, the body or housing 10 of the sensor is illustrated before assembly and installation of the various components required for the sensor. Preferably the housing 10 is comprised of a plastic that is a good electrical insulator, corrosion resistant, solvent resistant, and relatively unbreakable as for example polymethylmethacrylate, polypropylene or other suitable polyester materials or the like having these properties. The housing 10 may be molded or cast as a single unit or, as shown in the drawings, comprised of two pieces appropriately formed or machined and fixed together. A liquid cavity or reservoir 11 is formed in the lower portion of the housing 10 and extends substantially the entire length and width to provide the maximum practical volumetric capacity. A small inlet opening 12 is provided in one end of the housing and communicates with the reservoir 11 for initial filling of the reservoir with the liquid electrolyte as well as subsequently replenishing the supply of electrolyte. A vent opening 13 is provided in the top of the housing 10 and communicates with the reservoir 11 which, in the final assembly will allow pressure compensation between the reservoir 11 and the atmosphere without permitting any substantial evaporation of the liquid within the reservoir.

In the upper portion of the housing 10 near one end there is provided a cylindrical chamber 14 open at its top. Between cylindrical chamber 14 and reservoir 11 is a generally cylindrical compartment 15 adapted to receive the electrolytic cell components as hereinafter described. The compartment 15 is accessible through the open top of chamber 14. Between chamber 14 and compartment 15 is an annular shoulder 16. A short distance below shoulder 16 in compartment 15 is a second annular shoulder 17. The cylindrical shape of compartment 15 is interrupted by four notches 18 equally spaced about the circumference for a purpose that will hereinafter become apparent. The chamber 14 is provided with an annular groove 19 near the top of the chamber for accommodating a snap ring as hereinafter described.

The housing 10 is provided with a pair of threaded sockets 20 and 21 at the opposite end of the housing from the chamber 14 but at the same upper level as chamber 14. The sockets 20 and 21 are adapted to receive threaded connectors as hereinafter described for ingress and egress of the gas mixture to be measured. Small passageways 22 and 23 connect threaded sockets 20 and 21, respectively, to the chamber 14 at substantially spaced locations in chamber 14 whereby gas passing from one passageway to the other will cross substantially the entire chamber 14.

A shallow cavity 24 is formed in the end of housing 10 adjacent the chamber 14 and compartment 15 for accommodating the electrical connections required for the sensor. A port 25 extends from the cavity 24 into the chamber 14 for accommodating a temperature probe as hereinafter described. A small passageway 26 in housing 10 extends from cavity 24 laterally and then upwardly through the housing material to open onto the shoulder 16 for accommodating an electrical wire. A second passageway 27 extends from cavity 24 through the material housing 10 to open onto the shoulder 17, again to accommodate another electrical wire. In the final assembly the cavity 24 is covered as shown in FIG. 5 by an end plate 28 of electrically insulating material removably attached by any convenient means such as the four screws 29.

Figure 3:
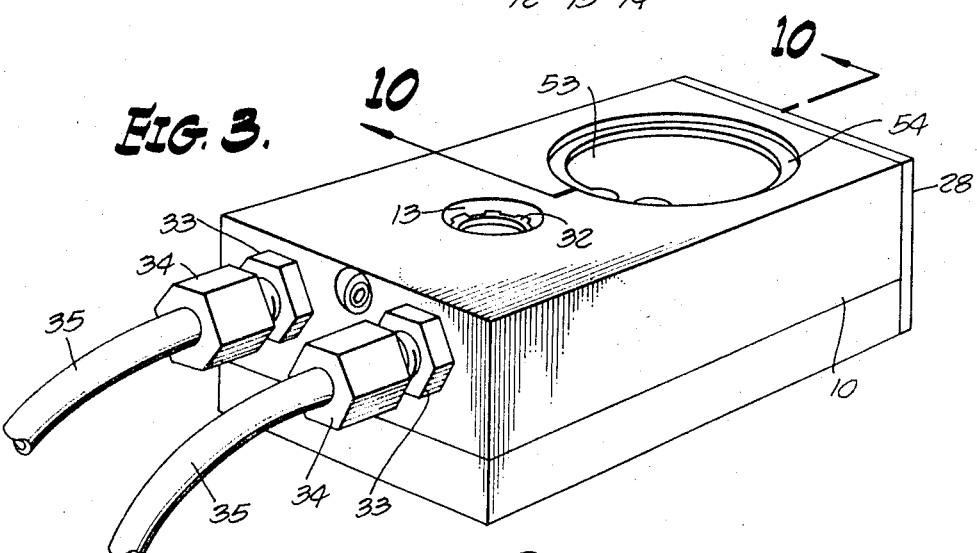
FIG. 3 is a perspective view of the electrolytic cell sensor of this invention in a substantially enlarged scale compared to FIGS. 1 and 2.
Figure 4:
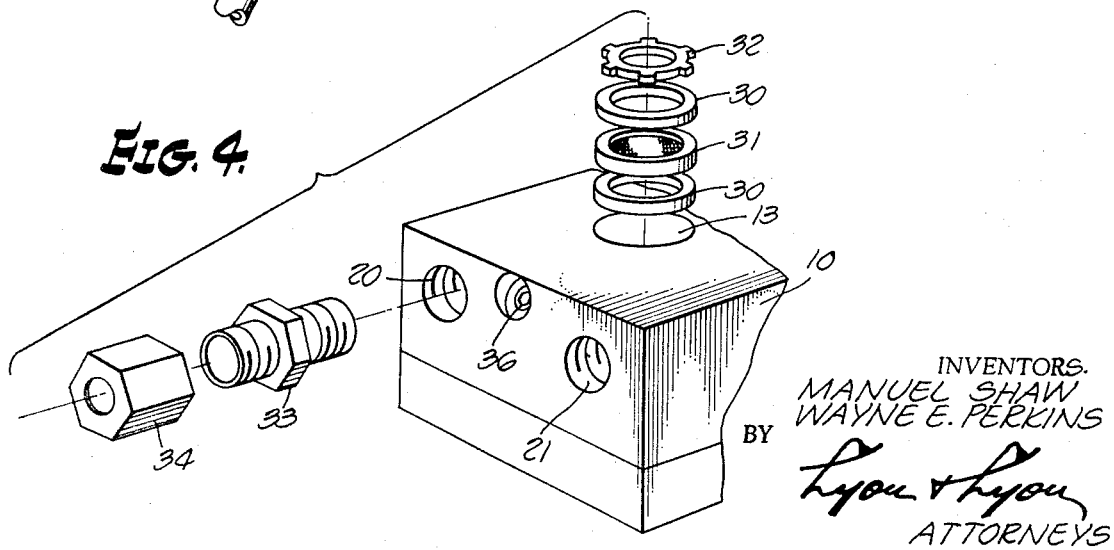
FIG. 4 is a fragmentary exploded view of a portion of the sensor illustrated in FIG. 3.

Referring now to FIGS. 3 and 4 the assembly for the vent opening 13 in the housing 10 is illustrated. A pair of resilient washers 30 are positioned on either side of the vent element 31 which may be either a composite element, as shown, or a plain disc of appropriate material for equalizing the pressure between the reservoir 11 and ambient conditions as well as allowing the venting of gases developed in reservoir 11 but also serving to minimize the evaporation from reservoir 11. One practical construction of vent element 31 that has been found is a disc of filter paper covered by a plastic disc having only a small aperture therethrough. The vent assembly is locked in the vent opening 13 against the shoulder therein by a retainer washer 32 of the type having outwardly extending prongs to frictionally engage the walls of the opening when pressed into place. A removable filler plug 36 is threadedly received in the filler port 12.

In order to connect the housing to the supply of gaseous mixture to be measured any convenient means may be employed such as that shown in FIGS. 3 and 4 comprising a nipple 33 threadedly received in the threaded socket 20 or 21 and cooperating with a threaded fitting 34 to releasably connect the tubes 35 to the housing. The nipples 33, fittings 34 and tubes 35 are preferably of a material that will completely resist the corrosive or solvent characteristics of the gaseous mixture to be encountered and materials such as Teflon or polyethylene have been found acceptable.

Referring now to FIGS. 10 and 11 the unique assemblage for conveniently forming the novel electrolytic cell and mounting same in the housing 10 is illustrated and for convenience it will be described in the order in which the individual elements are installed in the housing 10 during assembly. It will be understood that one or more of the individual elements comprising the assemblage may be preassembled or comprised of an equivalent integral element not requiring preassembly. Before making specific reference to the elements illustrated in the exploded view of FIG. 11, it should be noted that electrical wires 37 and 38 are installed in the housing in the passageways 26 and 27, respectively, in sealed relation with a portion of the length of each wire resting upon the respective shoulders 16 and 17 of the compartment 15. Further, an inert absorbent material 39 is placed in the reservoir cavity 11 to substantially fill the cavity when the electrolyte is added to minimize the sloshing of liquid within the cavity. Compressed synthetic sponge material has been found satisfactory for material 39 and it will expand substantially from its dry condition upon adding electrolyte.

Referring specifically to the electrolytic cell assemblage illustrated in FIGS. 10 and 11, an electrically conductive ring 40 is adapted to fit on the shoulder 17 and make electrical contact with the portion of wire 38 resting upon shoulder 17. A flat circular electrode 41 comprising a fine mesh screen of the appropriate metal for the electrolytic cell is positioned on top of the ring 40 and makes electrical contact therewith. Due to the low currents and voltage developed by the electrolytic cell and the desired high sensitive of the unit, the electrical conductivity between the screen 41 and ring 40 and in turn to the wire 38 is extremely important and thus it has been found desirable to form the ring 40 of such materials as thin gold sheet or gold plated tantalum and to preassemble the screen and ring, such as by soldering. Immediately above electrode 41 a plurality of absorbent discs are positioned in the compartment 15 and these discs may be of any convenient material such as filter paper. The four lowermost absorbent discs 42 each have an integral wick portion 43 bent downwardly to extend into the reservoir 11. The wick 43 of each disc 42 is accommodated in a separate one of the four vertical notches 18 provided in the compartment 15. Immediately above the four discs 42 that have the wicks 43 there are positioned an appropriate number of additional absorbent discs 44 to reach the level of the shoulder 16 in compartment 15 and it will be seen that the absorbent discs 42 and 44 fill the space between and separate the two electrodes of this electrolytic cell. An electrically conductive ring 45, similar to ring 40 but of a larger diameter, is positioned on shoulder 16 and makes electrical contact with the wire 37. The second screen electrode 46 is positioned on top of ring 45, is of the appropriate dissimilar metal material to form the electrolytic cell, and preferably is of an even finer mesh screen than electrode 41. A diaphragm or membrane 47 is mounted on top of screen electrode 46 and serves to separate the electrolytic cell compartment 15 from the gas chamber 14. The membrane 47 is of any convenient material that will allow the limited passage of gases therethrough, at least of the type of gases being analyzed, and yet will greatly inhibit and substantially prevent the passage of liquid electrolyte therethrough. One convenient material that has this semi-permeable characteristic and that has been found practical is Teflon film.

In order to conveniently mount the aforedescribed elements of the electrolytic cell in the housing 10 in an effective manner, an annular collar 48 of a depth slightly less than the depth of chamber 14 fits on top of membrane 47 and defines the gas chamber within chamber 14. Collar 48 is chamfered on the external upper and lower ends at 49 for accommodating O-ring type seals 50 around the exterior of the collar to seal the collar to the housing. A circular plate 51 fits on top of collar 48 and also forms a seal with the upper O-ring 50 to complete the air-tight closure of gas chamber 14. An annular spring washer 52 is positioned between plate 51 and a second circular plate 53 for resiliently compressing the aforedescribed elements into a tight assemblage, particularly the sealing O-rings 50. A snap ring 54 is installed above plate 53 in the groove 19 for retaining the entire assembly.

It should be noted that the collar 48 is provided with a pair of ports 55 in alignment with the passageways 22 and 23 for allowing the mixture of gases to enter and exit the chamber 14. A hole 56 is provided in collar 48 in registery with the port 25 in housing 10 to receive a thermistor 57 which extends into the gas chamber 14 from the shallow cavity 24. As is well known to those skilled in the art, the thermistor 57 has two electrical leads 58 and will generate a current corresponding to the temperature present in chamber 14.

Referring now to FIGS. 5 and 6, the wires 37 and 38 leading from the electrode contact rings 45 and 40 are in turn connected by wires 59 and 60 to pin type terminals 61 and 62, all respectively, that are mounted on the end plate 28 to extend outwardly. One thermistor lead 58 is connected to a third separate pin-type terminal 63 while, for convenience, the other thermistor lead 58 is connected to terminal 61.

It has been found that some of the electrolytic cells employed in this invention produce a more stable and reliable response when put into use if the electrodes are electrically connected while the cell is not in use although this is not true of all of the electrolytic cells. For this short circuiting purpose a leaf spring 64 of conductive material such as copper is provided on the interior of end plate 28 with one end 65 fixedly mounted on terminal 62 and the other end 66 resiliently urged against terminal 61 but free to move out of contact with terminal 61 to, in effect, form a switch. A hole 67 is provided in end plate 28 in registery with the spring 64 and near terminal 61 whereby an element inserted through hole 67 will disengage the end 66 of spring 64 from terminal 61 to electrically disconnect terminals 61 and 62 during use of the sensor.

Figure 2:
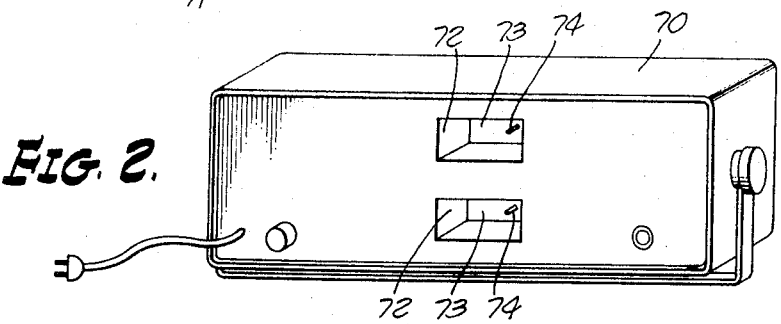
FIG. 2 is a perspective view of the rear of the electrical analyzing meter illustrated in FIG. 1.

FIGS. 1 and 2 illustrate the front and back of a typical analyzer of this invention and it is of the type for detecting two different gases as for example sulfur dioxide and nitrogen oxides. However it will be understood that the analyzer may be adapted to accommodate only one of the aforedescribed sensors for analyzing a single gas or more than the two illustrated in the figures for detecting more gases. The analyzer 70 includes appropriate electrical circuits of any conventional type and typical of meters well known to those skilled in the art for amplifying the electrical response of the sensor to produce a reading of such response on the scale 71. Sensors of the type that produce an electrical current are preferred and therefore the analyzer 70 is in effect an ammeter with appropriate amplification and corrections whereas if sensors of the type for producing variable resistance in response to variations in gas concentrations then analyzer 70 is, in effect, an ohmmeter.

The sensors are adapted to be plugged into the sockets 72 in the back of the analyzer 70 with the terminals 61, 62 and 63 mating with receptables in the base 73 of the sockets. A prong or probe 74 may be provided in each socket 72 in a position to extend through hole 67 in the sensor to disconnect the short circuit spring 64 for the aforedescribed purpose. When only a single gas is to be analyzed and the sensor for such gas is relatively unaffected by other gases in the mixture then only the single sensor need be inserted in the appropriate socket 72. When two distinct gases are to be detected and analyzed or a single gas the sensor for which is affected by another gas then two sensors are inserted in the sockets 72. As previously described, the hoses 35 are already connected to the sensor for passing the mixture of gases through the sensor during monitoring. A selector switch 75 serves to connect the appropriate electrical circuit to the meter or scale 71 for giving the reading with respect to the selected gas. The analyzer 70 may be provided with various controls 76 for adjusting the reading of the scale 71 such as adjusting the scale to the null or zero reading and calibrating the reading with a gaseous mixture of a known proportion of the selected gas. Such null adjustment or calibrating can be periodically performed to insure the continued accurate response of the analyzer as well as the sensor.

Summarizing the operation of this invention, the mixture of gases or other fluidic mixture to be analyzed is passed through the sensor by hoses 35 when the testing is to be accomplished, whether continuously or intermittently, and in so doing the gaseous mixture passes through the chamber 14 and is exposed to the membrane 47. A portion of the gaseous mixture passes through the membrane and is exposed to the electrolytic cell. By the appropriate selection of the dissimilar metal materials for the electrodes 41 and 46 and the electrolyte for reservoir 11 in accordance with principals well known to those skilled in the art, a particular gas or number of gases will produce an oxidation or reduction process to generate a variable current (or variable resistance with other types of cells) which will have a magnitude related to the proportion of such gas or number of gases present in the mixture of gases. Further the degree of sensitivity of the electrolytic cell can be appropriately established whereby the cell will be specifically adapted for the intended use related to the concentration of the gases expected to be found. For example a cell for monitoring ambient conditions will be substantially more sensitive due to low concentration than a cell for monitoring stack gases. However by adopting specific ranges of responses for various cells to produce similar electric currents, the same analyzer 70 may be used for monitoring ambient or stack gas conditions merely by interchanging appropriate sensors with the scale 71 registering the percent of the adopted range of gas concentration measured by that particular sensor. For example one sulfur dioxide sensor may be provided with a responsive range of zero to 50 parts per million of sulfur dioxide in the mixture of gases which would usually be in an ambient condition while another sulfur dioxide sensor may have a full range response of zero to ten thousand parts per million of sulfur dioxide in the mixture of gases which would be a stack gas or other source type of monitoring, and yet the currents developed by each sensor are the same for their full ranges of response.

In the present state of the art, electrolytic cells that are responsive to certain gases unfortunately are also responsive to certain other gases that are likely to occur in the same ambient or stack gas conditions whereby the response of the electrolytic cell will not truly represent the concentration of only the first gas but rather will be uncontrollably influenced by the second gas. For example an electrolytic cell that will detect nitrogen oxides (such as nitric oxide and nitrogen dioxide) will also be influenced by the presence of sulfur dioxide thereby producing a response that represents the combination of these nitrogen oxides and sulfur dioxide. However by this invention there is provided the analyzer 70 which is capable of monitoring the responses of two sensors and therefore by simultaneously monitoring with one sensor the proportion of the gas in the mixture that undesirably influences the response of the other sensor which is intended to monitor the selected gas, the analyzer 70, through appropriate circuitry, will electrically correct the undesirably affected response to produce a reading on scale 71 of only the selected gas. In other words, the analyzer 70 substracts electronically the proportion of sulfur dioxide which the other electrolytic cell is incapable of distinguishing and segregating from the nitrogen oxides. The analyzer 70 also serves to electronically compensate for the variations in electrolytic cell response due to temperature variations by employing the current produced by the thermistor 57.

Thus it may be seen that by this invention there is provided a novel form of electrochemical sensor of extremely rugged but simple construction having the capability of extremely sensitive response. Further the combined apparatus of appropriate sensors and the analyzer is capable of monitoring any mixture of gases regardless of concentration variations, temperature variations and undesirable influence of a gas or gases on the response of one electrolytic cell that is designed to detect other gases. The entire arrangement is portable, requires no flowing fluids, and may be effectively operated with a minimum of instruction and no particular skill.

We claim:

1. An apparatus for analyzing the presence of one or more selected components of a fluidic mixture, comprising, a sensor comprising a housing having electrolytic cell means for detecting such selected components and producing an electrical response related to the proportion of such selected components in such fluidic mixture, said sensor having external electrical pin terminals fixedly mounted on and projecting from said housing and carrying said electrical response, said sensor housing having an adjacent chamber and compartment each being completely enclosed and separated by a semipermeable membrane, said sensor housing having inlet and outlet means communicating with the chamber for passing the fluidic mixture through the chamber, said electrolytic cell means being mounted in the compartment and including a pair of flat screens of dissimilar metals mounted in spaced relationship to form cell electrodes, liquid absorbent means separating and filling the space between said screens, liquid electrolyte in communication with said absorbent means, means electrically connecting each screen electrode to a separate one of said pin terminals, and electrical meter means having a socket for removably receiving said sensor and said pin terminals for physically supporting said sensor and electrically connecting to said terminals, said meter means converting said electrical response into a quantitative representation of the proportion of such selected components in such fluidic mixture.

2. The apparatus of claim 1 in which the sensor has a reservoir containing the liquid electrolyte, said reservoir located in the bottom of the housing when mounted in said socket, said reservoir is in complete communication with said electrolytic cell means and said liquid absorbent means.

3. The apparatus of claim 2 wherein the reservoir is provided with a vent having a semipermeable closure for allowing the escape of gas and pressure equalization but inhibiting the loss of electrolyte.

4. The apparatus of claim 1 wherein said electrical meter means has at least two said sockets, plural sensors equal in number to the number sockets are provided, each said sensor having a different electrolytic cell means for detecting different selected components of such fluidic mixture, and said electrical meter means having selectively operable switch means for monitoring the response of a selected sensor.

5. The apparatus of claim 4 wherein a first said sensor detects first selected components of such fluidic mixture, a second said sensor detects second selected components of such fluidic mixture as well as said first selected components, and said electrical meter means having means for electrically correlating the responses of said first and second sensors to produce a quantitative representation of the proportion of said second selected components.

6. The apparatus of claim 1 in which said compartment for receiving said electrolytic cell is generally cylindrical and said screen electrodes are circular, said compartment leaving annular shoulders for supporting said screen electrodes, and said electrical connecting means comprise separate wires with a portion of each wire positioned on a said shoulder for pressure contact with said screen electrode.

7. The apparatus of claim 1 wherein said liquid absorbent means is comprised of a plurality of filter papers.

8. The apparatus of claim 1 in which a restricted passageway communicates said inlet means with said chamber for minimizing pressure surges in said chamber and on said electrolytic cell means upon variations in the pressure of the fluidic mixture supplied to the sensor.

9. The apparatus of claim 1 wherein a temperature responsive element is mounted in said sensor housing in said chamber in direct communication with the fluidic mixture passing through said chamber, said temperature responsive element producing a second electrical response and having electrical terminals connecting the element to the electrical meter means with the sensor in the socket, and said electrical meter means employing said second electrical response for compensating for the effects of temperature on the detecting response of said electrolytic cell means.

10. An apparatus for analyzing the presence of one or more selected components of a fluidic mixture, comprising, a sensor having electrolytic cell means for detecting such selected components and producing an electrical response related to the proportion of such selected components in such fluidic mixture, said sensor having external electrical terminals carrying said electrical response, said sensor having inlet and outlet means communicating with a chamber for passing the fluidic mixture through the chamber, said electrolytic cell means being mounted in said sensor in fully exposed relationship to said chamber, said electrolytic cell means including two electrodes of dissimilar metals, a selectively operable switch provided in said sensor for electrically connecting said pair of electrodes during non-use of the sensor, and electrical meter means having a socket for removably receiving said sensor and electrically connecting to said terminals, said meter means converting said electrical response into a quantitative representation of the proportion of such selected components in such fluidic mixture.

11. The apparatus of claim 10 in which said sensor and said electrical meter means include cooperating means for operating said switch to disconnect said electrodes upon insertion of said sensor into said socket.

12. In an apparatus for analyzing the presence of one or more selected components of a fluidic mixture which apparatus employs an electrical meter to convert a variable electrical response from a sensor into a representation of the proportion of said selected components, wherein the improvement comprises a sensor that includes a housing having inlet and outlet connections communicating with a chamber for such fluidic mixture to pass through said chamber from said inlet to said outlet, said housing having a liquid reservoir separate from said chamber and containing an electrolyte, an electrolytic cell mounted in said housing between said chamber and said reservoir for producing such variable electrical response corresponding to variations in the proportion of such selected components in such fluidic mixture passing through said chamber, said electrolytic cell including a pair of flat electrodes of dissimilar metals mounted in spaced relationship with one electrode adjacent said chamber, liquid absorbent means filling the space between said electrodes and and saturated with the electrolyte from said reservoir, said liquid absorbent means including a plurality of filter papers with integral portions thereof comprising wick means extending from filter papers into said reservoir for continuously supplying the electrolyte to said filter papers, a membrane separating said cell from said chamber and covering the said one electrode for preventing the passage of electrolyte and allowing the limited passage of such fluidic mixture therethrough, and said housing having a vent opening from said reservoir with a semi-permeable closure in said vent opening for allowing the escape of gas and pressure equalization but inhibiting the loss of electrolyte.

13. In an apparatus for analyzing the presence of one or more selected components of a fluidic mixture which apparatus employs an electrical meter to convert a variable electrical response from a sensor into a representation of the proportion of said selected components, wherein the improvement comprises a sensor that includes a housing having inlet and outlet connections communicating with a chamber for such fluidic mixture to pass through said chamber from said inlet to said outlet, said housing having a liquid reservoir separate from said chamber and containing an electrolyte, an electrolytic cell mounted in said housing between said chamber and said reservoir for producing such variable electrical response corresponding to variations in the proportion of such selected components in such fluidic mixture passing through said chamber, said electrolytic cell including a pair of flat electrodes of dissimilar metals mounted in spaced relationship with one electrode adjacent said chamber, said electrodes being circular and of different diameters, the portion of said housing containing said electrolytic cell being generally cylindrical and having two annular shoulders of different diameters facing the same direction at opposite axial extremities of the compartment with one of said electrodes positioned on each said shoulder, an electrically conductive ring positioned on each of the two annular shoulders between the respective electrode and shoulder, such electrolyte from said reservoir being in the space between said electrodes, and a membrane separating said cell from said chamber preventing the passage of electrolyte and allowing the limited passage of such fluidic mixture.

14. The apparatus of claim 13 in which said flat electrodes are comprised of fine mesh woven screen, and an annular electrically conductive ring is joined to each said screen with each said ring adapted to fit on the respective annular shoulder on which said screen is positioned.

15. In an apparatus for analyzing the presence of one or more selected components of a fluidic mixture which apparatus employs an electrical meter to convert a variable electrical response from a sensor into a representation of the proportion of said selected components, wherein the improvement comprises a sensor that includes a generally rectangular housing of greater longitudinal length than lateral width and vertical thickness, a generally cylindrical cavity formed at one longitudinal end of the housing and open upwardly with its cylindrical axis oriented vertically, a reservoir formed along the bottom of the full length of the housing in open communication with the bottom of said cavity, an electrolyte in said reservoir, said cavity having three portions of different diameters progressively reducing in the downward direction to provide two upwardly facing shoulders located respectively between the upper and middle portions and between the middle and lower portions, a pair of passageways in said housing with one leading from each said shoulder to the end of the housing having said cavity, a separate electrically conductive wire extending through each said passageway and having a portion of one end laying on the respective shoulder, the other end of each said wire being connected to a terminal for conducting the variable electrical response to the electrical meter, a pair of flat circular electrodes of dissimilar metals in mesh form, one said electrode having a diameter equal to the size of the lower shoulder and being removably positioned thereon in contact with the said wire portion thereon, liquid absorbent means positioned on said one electrode and filling said middle cylindrical portion of said cavity up to said upper shoulder and being saturated with electrolyte from said reservoir, the other said electrode having a larger diameter equal to the size of said upper shoulder and being removably positioned thereon in contact with the said wire portion thereon and enclosing the said liquid absorbent means, a membrane covering the upper surface of said other electrode, a ring removably positioned in said upper portion of said cavity and having an outside diameter to fit said upper portion and a vertical height slightly less than the height of said upper portion, a closure means removably mounted above and retaining said ring in said cavity to form a chamber within said ring between said membrane and closure means, means sealing said ring to said membrane and said closure means, inlet and outlet connections on said housing and mating ports in said housing and ring for communicating said connections with said chamber for passing the fluidic mixture through said chamber from said inlet connection to said outlet connection for the electrolytic cell formed by said electrodes and electrolyte to sense the components of the fluidic mixture passing through said chamber and produce the variable electrical response.

16. The apparatus of claim 15 wherein a vent opening from said reservoir is formed in said housing on the upper side and at the opposite longitudinal end from said cavity, and a semiperimeable closure in said vent opening for allowing the escape of gas and pressure equalization but inhibiting the loss of electrolyte.

17. The apparatus of claim 16 wherein an absorbent means substantially fills said reservoir and is saturated with said electrolyte.

18. The apparatus of claim 15 wherein said closure means includes an impervious circular plate fitting over said ring and a snap ring removably positioned thereabove and engaging said housing cavity to retain said plate in position.

19. The apparatus of claim 18 wherein an annular spring washer is positioned between said ring and plate to resiliently retain the assembly of electrodes, absorbent means, and ring in said cavity.

20. The apparatus of claim 15 wherein said sealing means comprise a pair of O-ring seals with one positioned above and the other below said ring, and said ring has chamfers on the external upper and lower extremities for receiving said O-rings.

21. The apparatus of claim 15 wherein said ports in said housing and ring are of reduced size to provide a restriction to the flow of fluidic mixture to said chamber to minimize the effects of pressure changes in said fluidic mixture.

* * * * *